US010592444B2

(12) United States Patent
Nicol et al.

(10) Patent No.: US 10,592,444 B2
(45) Date of Patent: Mar. 17, 2020

(54) RECONFIGURABLE INTERCONNECTED PROGRAMMABLE PROCESSORS

(71) Applicant: Wave Computing, Inc., Campbell, CA (US)

(72) Inventors: Christopher John Nicol, Campbell, CA (US); Samit Chaudhuri, Cupertino, CA (US); Radoslav Danilak, Cupertino, CA (US)

(73) Assignee: Wave Computing, Inc., Santa Clara, CA (US)

( * ) Notice: Subject to any disclaimer, the term of this patent is extended or adjusted under 35 U.S.C. 154(b) by 0 days.

(21) Appl. No.: 15/449,852

(22) Filed: Mar. 3, 2017

(65) Prior Publication Data

US 2017/0177517 A1 Jun. 22, 2017

Related U.S. Application Data

(63) Continuation-in-part of application No. 14/149,009, filed on Jan. 7, 2014, now Pat. No. 9,588,773.
(Continued)

(51) Int. Cl.
*G06F 9/302* (2018.01)
*G06F 15/17* (2006.01)
(Continued)

(52) U.S. Cl.
CPC ........ *G06F 13/1673* (2013.01); *G06F 9/3001* (2013.01); *G06F 9/30014* (2013.01);
(Continued)

(58) Field of Classification Search
CPC .... G06F 9/3001; G06F 9/4418; G06F 9/5066; G06F 9/5077; G06F 9/544; G06F 9/381;
(Continued)

(56) References Cited

U.S. PATENT DOCUMENTS 4,288,857 A * 9/1981 Wilterding .............. G06F 17/15
342/379
6,006,022 A * 12/1999 Rhim .................. G06F 17/5027
703/26
(Continued)

FOREIGN PATENT DOCUMENTS

JP 2005165961 A 12/2003
WO WO2009131569 A1 10/2009

OTHER PUBLICATIONS

International Search Report dated Feb. 6, 2015 for PCT/US2014/063591.
(Continued)

*Primary Examiner* — Daniel H Pan
(74) *Attorney, Agent, or Firm* — Adams Intellex, PLC

(57) ABSTRACT

A plurality of software programmable processors is disclosed. The software programmable processors are controlled by rotating circular buffers. A first processor and a second processor within the plurality of software programmable processors are individually programmable. The first processor within the plurality of software programmable processors is coupled to neighbor processors within the plurality of software programmable processors. The first processor sends and receives data from the neighbor processors. The first processor and the second processor are configured to operate on a common instruction cycle. An output of the first processor from a first instruction cycle is an input to the second processor on a subsequent instruction cycle.

22 Claims, 6 Drawing Sheets

Related U.S. Application Data

(60) Provisional application No. 62/399,823, filed on Sep. 26, 2016, provisional application No. 61/749,419, filed on Jan. 7, 2013.

(51) Int. Cl.

| | | |
|---|---|---|
| *G06F 15/76* | (2006.01) | |
| *G06F 13/42* | (2006.01) | |
| *G06F 1/32* | (2019.01) | |
| *G06F 13/16* | (2006.01) | |
| *G06F 13/40* | (2006.01) | |
| *G06F 9/30* | (2018.01) | |
| *G06F 9/4401* | (2018.01) | |
| *G06F 9/38* | (2018.01) | |
| *G06F 15/173* | (2006.01) | |
| *G06F 15/82* | (2006.01) | |
| *G06F 1/324* | (2019.01) | |

(52) U.S. Cl.
CPC .......... *G06F 9/3891* (2013.01); *G06F 9/4418* (2013.01); *G06F 13/4068* (2013.01); *G06F 15/17* (2013.01); *G06F 1/324* (2013.01); *G06F 9/381* (2013.01); *G06F 9/3814* (2013.01); *G06F 9/3869* (2013.01); *G06F 13/4059* (2013.01); *G06F 13/423* (2013.01); *G06F 15/17362* (2013.01); *G06F 15/825* (2013.01)

(58) Field of Classification Search
CPC ............. G06F 13/1673; G06F 13/4068; G06F 1/3215; G06F 1/3203; G06F 1/3287; G06F 1/3296; G06F 15/7867; G06F 15/8007; G06F 15/8015; G06F 15/8046; G06F 15/8023; G06F 15/825; G06F 9/30014; G06F 15/17362; G06F 9/3891; G06F 9/3869; G06F 9/3802; G06F 9/3814; G06F 13/40; G06F 13/4059; G06F 13/385; G06F 13/4027; G06F 13/423; G06F 13/4256; G06F 1/10; G06F 1/324; G06F 3/0659

USPC ............ 712/10–22; 713/232, 324, 323, 503; 710/305, 310

See application file for complete search history.

(56) References Cited

U.S. PATENT DOCUMENTS

| | | |
|---|---|---|
| 6,134,605 A | 10/2000 | Hudson et al. |
| 6,289,434 B1* | 9/2001 | Roy .................... G06F 15/7867 712/22 |
| 6,363,470 B1 | 3/2002 | Laurenti et al. |
| 6,385,672 B1* | 5/2002 | Wang ........................ G06F 5/14 710/305 |
| 7,420,390 B1 | 9/2008 | Hutton et al. |
| 8,078,839 B2 | 12/2011 | Fant |
| 8,314,636 B2 | 11/2012 | Hutton et al. |
| 8,341,469 B2 | 12/2012 | Miyama et al. |
| 2006/0075203 A1* | 4/2006 | Dutta ..................... G06F 5/065 711/173 |
| 2007/0133399 A1 | 6/2007 | Gangwal |
| 2009/0089605 A1 | 4/2009 | Westwick et al. |
| 2010/0013517 A1 | 1/2010 | Manohar et al. |
| 2010/0281448 A1 | 11/2010 | He |
| 2011/0199117 A1 | 8/2011 | Hutchings et al. |
| 2011/0231463 A1* | 9/2011 | Gunwani ............ H03K 19/177 708/232 |
| 2012/0119781 A1 | 5/2012 | Manohar et al. |
| 2012/0235839 A1 | 9/2012 | Mazumdar et al. |
| 2012/0319730 A1 | 12/2012 | Fitton et al. |
| 2013/0009666 A1 | 1/2013 | Hutton et al. |
| 2013/0009667 A1 | 1/2013 | Calhoun et al. |
| 2013/0043902 A1 | 2/2013 | Rahim et al. |
| 2014/0075144 A1 | 3/2014 | Sanders et al. |
| 2015/0123707 A1* | 5/2015 | Nicol ............. H03K 19/017581 326/41 |

OTHER PUBLICATIONS

Stratix II Device Handbook, vol. 1, published by Altera Corporation© May 2007.

* cited by examiner

RECONFIGURABLE INTERCONNECTED PROGRAMMABLE PROCESSORS

RELATED APPLICATIONS

This application claims the benefit of U.S. provisional patent application "Reconfigurable Interconnected Programmable Processors" Ser. No. 62/399,823, filed Sep. 26, 2016. This application is also a continuation-in-part of U.S. patent application "Software Based Application Specific Integrated Circuit" Ser. No. 14/149,009, filed Jan. 7, 2014, which claims the benefit of U.S. provisional patent application "Software Based Application Specific Integrated Circuit" Ser. No. 61/749,419, filed Jan. 7, 2013. Each of the foregoing applications is hereby incorporated by reference in its entirety.

FIELD OF ART

This application relates generally to computation and more particularly to reconfigurable programmable processors which are interconnected.

BACKGROUND

Modern integrated circuits and semiconductor chips perform a wide variety of functions in the electronic systems with which people interact daily. The chips result from highly complex circuit designs, architectures, and implementations. They are integral to the electronic systems, providing communications, computing, and networking for business, entertainment, or consumer electronics. The electronic systems routinely contain more than one chip, and the chips perform critical functions such as computation, storage, and control. These chips compute algorithms and heuristics, handle data, communicate internally and externally to the electronic system, and so on, in support of the purposes of the electronic systems. Since there are so many computations that must be performed, any improvements in the efficiency of the chips have a large impact on overall system performance. As the amount of data to be handled increases, the approaches that are used must be not only effective, efficient, and economical, but must also scale to accommodate the increase of information processing.

Various semiconductors, including application specific integrated circuits (ASICs), are designed with a particular purpose in mind. As a downside of the specific design parameters of an ASIC, the circuit can no longer be altered after it leaves the production line. For this reason, ASIC designers need to be sure of their design, especially when producing large quantities of the same ASIC to prevent waste. In contrast, a programmable logic device such as a field programmable gate array (FPGA) is also a type of semiconductor, but does not have specific programming built into the design during production. Programmable logic devices often can be reprogrammed while remaining in their environment of use (e.g. while mounted on the circuit board within which the device is intended to function). Programmable logic devices typically include logic blocks (e.g. programmable Boolean logic gates) and can also include programmable memory blocks, programmable clocking blocks, and other specialized programmable blocks such as multiplier blocks and I/O ports.

Typically, programmable logic devices are programmed using a programming language to implement specific, desired logic into the programmable logic devices. The programmable logic devices can be programmed by writing data to storage on the programmable logic devices. A programmable logic device's architecture includes a programmable routing structure and an array of configurable logic blocks. The programmable routing matrix includes an ability to connect configurable logic blocks to each other. However, the programming of programmable logic devices often takes longer by orders of magnitude to effect than the actual execution of the programmed function.

Programmable logic devices allow adaptability to future (unforeseen) changes in functional requirements. In some cases, programmable logic devices are used as prototypes for ASIC or other devices. Using a programmable logic device as a prototype for an ASIC for verification and initial software development is a useful way to both decrease development time and reduce the risk of first silicon failure for the ASIC. Programmable logic devices function well in many applications such as digital video, graphics processing, communications, encryption, medical equipment, mobile computing, and instrumentation, areas which are all continuing to play an important role in the implementation of many new programmable logic designs.

SUMMARY

Disclosed embodiments provide for improving data handling performance by interconnecting reconfigurable programmable processors. An apparatus for processing is disclosed comprising a plurality of software programmable processors controlled by rotating circular buffers. A first processor and a second processor within the plurality of software programmable processors are individually programmable. The first processor within the plurality of software programmable processors is coupled to neighbor processors within the plurality of software programmable processors. The first processor sends data to and receives data from the neighbor processors. The first processor and the second processor are configured to operate on a common instruction cycle. An output of the first processor from a first instruction cycle is an input to the second processor on a subsequent instruction cycle.

The second processor can be one of the neighbor processors. The subsequent instruction cycle can be a next instruction cycle. The first processor can comprise an arithmetic logic unit controlled by a circular buffer. The plurality of software programmable processors can comprise a reconfigurable fabric. The common instruction cycle can be defined by a hum cycle boundary. The plurality of software programmable processors can comprise a dataflow processor.

The processing of large amounts of unstructured data has found many applications in areas such as artificial intelligence, machine learning (including deep learning), and so on. To process the large amounts of data required for machine learning, designers have options such as building or buying faster processors, designing custom integrated circuits (chips), or implementing application specific integrated circuits (ASIC), etc. These approaches are based on computer and chip architectures that are focused on how control of the chip operations (control flow) is performed rather that the flow of data through the chips. In a control flow architecture, the order of instructions, functions, and subroutines is determined. In a dataflow architecture, the execution of instructions, functions, subroutines, etc. is based on the presence or absence of data. This latter approach, that of a dataflow architecture, is better suited to handling the large amounts of unstructured data that is processed as part of the learning applications.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
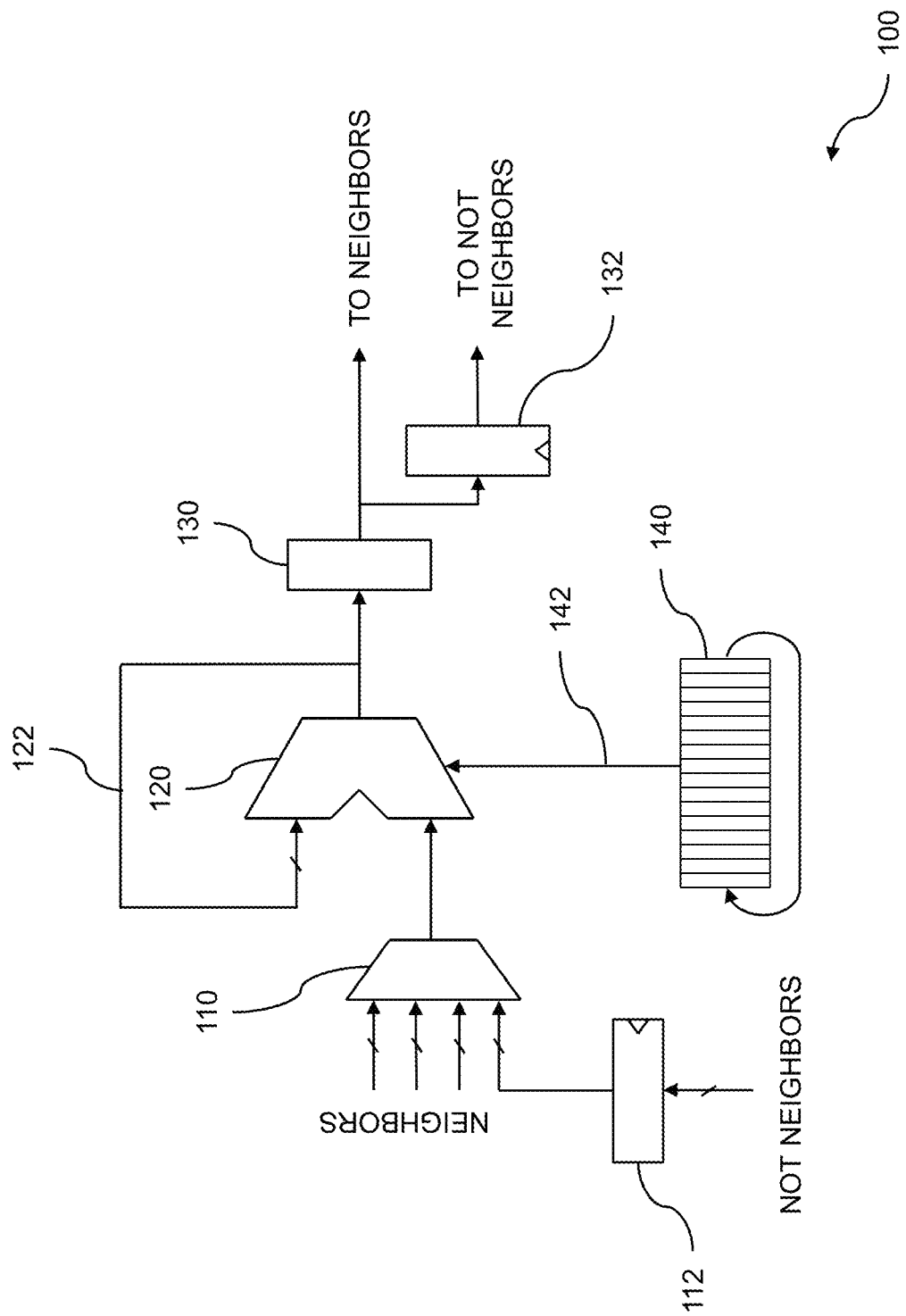
FIG. 1 is a block diagram for processing.

A set of circuits is disclosed for computation. The electronics industry is driven by commercial, military, and other market segments to improve the semiconductor chips and systems that it designs, develops, and fabricates. Improvement of the semiconductor chips is measured based on many factors including design criteria such as the size, speed, power consumption, heat dissipation, feature sets, compatibility, etc. The improvements find their way into designs of the semiconductor chips and the capabilities of the electronic systems that are built around the chips. The semiconductor chips and systems are deployed in many market driven and consumer driven applications. The applications include computation, digital communications, control and automation, etc., naming only a few. The abilities of the chips to perform basic logical operations and to process data, at high speed, are fundamental to any of the chip and system applications. The abilities of the chips to process very large data sets have become particularly critical because of the demands of applications such as artificial intelligence and machine learning. The latter can include deep learning.

Chip, system, and computer architectures have traditionally relied on controlling the flow of data through the chip, system, or computer. In these architectures, such as the classic Van Neumann architecture, a set of instructions is executed to process data. With such an architecture a "control flow", the execution of the instructions, can be predicted and can be deterministic. That is, the way in which data is processed is dependent upon the point in a set of instructions at which a chip, system, or computer is operating. In contrast, a "dataflow" architecture is one in which the data controls the order of operation of the chip, system, or computer. The dataflow control can be determined by the presence or absence of data. Dataflow architectures find applications in many areas including the fields of networking and digital signal processing, as well as other areas in which large data sets must be handled, such as telemetry and graphics processing.

Interconnecting reconfigurable programmable processors can improve data handling performance and enhance design flexibility. Because unstructured data processing can be so complex and compute resource demanding, reconfigurable interconnected programmable processors can greatly improve dataflow processing speed and performance. A plurality of software programmable processors can be controlled by rotating circular buffers. A first processor and a second processor within a plurality of software programmable processors can be individually programmable. The first processor within the plurality of software programmable processors can be coupled to neighbor processors within the plurality of software programmable processors. The first processor can send and receive data from the neighbor processors. The first processor and the second processor can be configured to operate on a common instruction cycle. An output of the first processor from a first instruction cycle can be an input to the second processor on a subsequent instruction cycle. In embodiments, the second processor can be one of the neighbor processors. In embodiments, the subsequent instruction cycle can be a next instruction cycle. In embodiments, the first processor can comprise an arithmetic logic unit controlled by a circular buffer.

An input for the arithmetic logic unit can come from one of the neighbor processors or from a location beyond the neighbor processors. The first processor can further comprise an accumulator wherein the arithmetic logic unit provides input to the accumulator. An output from the accumulator can be provided to one or more of the neighbor processors or to a location beyond the neighbor processors. In addition, an output from the accumulator can be provided as input to the arithmetic logic unit.

FIG. 1 is a block diagram for processing. Processor 100 can comprise an arithmetic logic unit (ALU) 120. The output of ALU 120 can feed accumulator 130. The output of ALU 120 can also be fed back into an input of ALU 120 via feedback path 122. Another input of ALU 120 can be supplied by multiplexor (MUX) 110. MUX 110 can be supplied from other processors, three of which can be from neighbor processors, and one of which can be from a non-neighbor processor. Other embodiments include different combinations of neighbor processors and non-neighbor processors. Neighbor processors can be determined by a clustering arrangement, which will be described in FIG. 2. The non-neighbor processor input to MUX 110 can be synchronized through latch 112. The output of accumulator 130 can feed neighbor processors. The output of accumulator 130 can feed non-neighbor processors through synchronization latch 132. The ALU 120 can be controlled through control path 142 by circular buffer 140.

The circular buffer can be statically scheduled. The circular buffer can provide for dynamic programming of the arithmetic logic unit. The circular buffer can contain instructions, data, status bits, control bits etc. As is the case for the first dataflow processing element, and the other dataflow processing elements, the second dataflow processing element is controlled by a second circular buffer. The second circular buffer can contain instructions, data, status bits, control bits etc. The second circular buffer can be statically scheduled. The circular buffers that control the dataflow processors can be rotated in order to access instructions, data, block addresses, etc. The rotating of the circular buffer can cause changes in the operation of the dataflow processor. In embodiments, the first circular buffer can dynamically change operation of the first dataflow processor based on the first circular buffer rotating. Rotating other circular buffers can dynamically change operations of other dataflow processors based on the circular buffer rotating. The circular buffers can rotate, or not rotate, independently of each other. The first circular buffer can be programmed and instructions can be pre-processed to provide instructions to the first circular buffer for dynamic programming. The other circular buffers can be similarly programmed and the instructions for the other circular buffers can be pre-processed. The dynamic programming can control the first dataflow processor. Further, dynamic programming can control the second dataflow processor, a third dataflow processor, and so on.

Circular buffer 140 can be programmed to be a certain length. That is to say, as the circular buffer rotates through its instructions, data, status bits, control bits, etc., it will at some point arrive at the last entry in the buffer. The next entry to be used is back at the beginning of the circular buffer, to the start entry, hence the "circular" nature of the buffer. This is sometimes referred to as a return to zero (RTZ) approach. The start entry index and the last entry index are programmable. Thus the effective length, or size, of the circular buffer 140 is programmable. It can be appreciated, therefore, that a programmed, particular size of circular buffer will exhibit certain execution timing properties with respect to its length.

Considering now the neighbor processors coupled to the output of accumulator 130, it can likewise be appreciated that each neighbor's circular buffer may also be programmed to a particular size. Depending on the nature of the instructions being executed from circular buffer 140 and the instructions being executed on neighboring processors' circular buffers, it may be advantageous to program the neighboring processors' circular buffers to a particular size as well. In embodiments, the neighboring processors' circular buffers can be programmed to the same length as the circular buffer 140 of processor 100. In further embodiments, the neighboring processors' circular buffers can be programmed to a harmonic length of circular buffer 140 of processor 100. The harmonic lengths can be ¼X ½X, 1X, 2X 3X, and so on, where X is the length of circular buffer 140. For example, circular buffer 140 may be programmed to a length of 128 entries. The circular buffer of a neighbor processor may be programmed to a length of 256 entries. In this manner, a natural timing relationship can exist between processors. In still further embodiments, the neighboring processors can comprise neighbor processors and not neighbor processors.

In embodiments, the common instruction cycle can be defined by a hum cycle boundary. In embodiments, a synchronous circuit can operate at a hum frequency. A hum frequency can be defined as a frequency at which multiple elements within a synchronous circuit self-synchronize to each other. Receiving data from the synchronous circuit into memory can be performed at a multiple of the hum frequency. Thus, the synchronous circuit can be clocked with a hum-generated signal.

The synchronous circuit can include a configurable switching fabric circuit that provides data to be processed by an asynchronous circuit and. An interface circuit can be configured and disposed to receive data from the synchronous circuit and send it to the asynchronous circuit, and can utilize one or more memories for receiving input from the synchronous stage. In embodiments, a circular buffer within the interface circuit contains instructions that coordinate the transfer of data from one or more switches within the switching fabric circuit of the synchronous stage to the memory. In embodiments, the plurality of software programmable processors can comprise a reconfigurable fabric. In embodiments, the plurality of software-programmable processors can comprise a dataflow processor.

Figure 2:
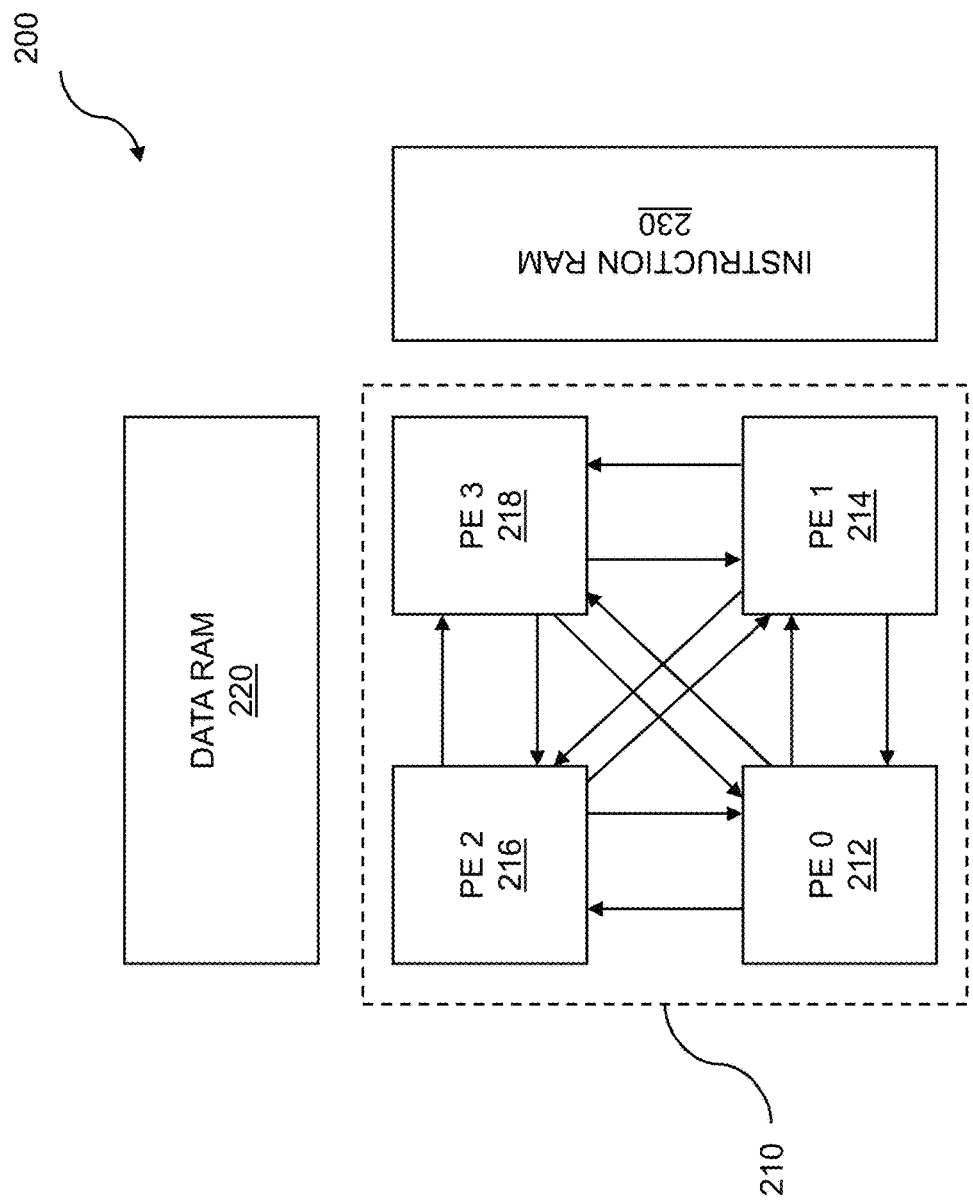
FIG. 2 shows processing elements with storage.

FIG. 2 shows dataflow processing elements with storage. Diagram 200 shows a cluster 210 of processing elements. Cluster 210 is comprised of interconnected processing elements (PEn, where "n" indicates a numerical designation of the processing element). Specifically, cluster 210 comprises PE0 212, PE1 214, PE2 216, and PE3 218. The PEs are all interconnected. PE0 212 can be interconnected to PE1 214, PE2 216, and PE3 218. PE1 214 can be interconnected to PE0 212, PE2 216, and PE3 218. PE2 can be interconnected to PE0 212, PE1 214, and PE3 218. PE3 can be interconnected to PE0 212, PE1 214, and PE2 216. The interconnected cluster 210 of processing elements can comprise neighbor processing elements. Processing elements in other clusters (not shown) can comprise not neighbor processing elements. Diagram 200 also shows storage elements supporting cluster 210. Data random access memory (RAM) 220 can contain data used by the processing elements in cluster 210. Instruction RAM 230 can contain instructions used by the processing elements in cluster 210. The RAM can be comprised of dynamic RAM (DRAM) or static RAM (SRAM). The RAM can be comprised of many other types of storage such as NAND flash memory, etc. In embodiments, the processing elements of cluster 210 comprise a dataflow processor. In embodiments, the processing elements of cluster 210 comprise a reconfigurable fabric.

Figure 3:
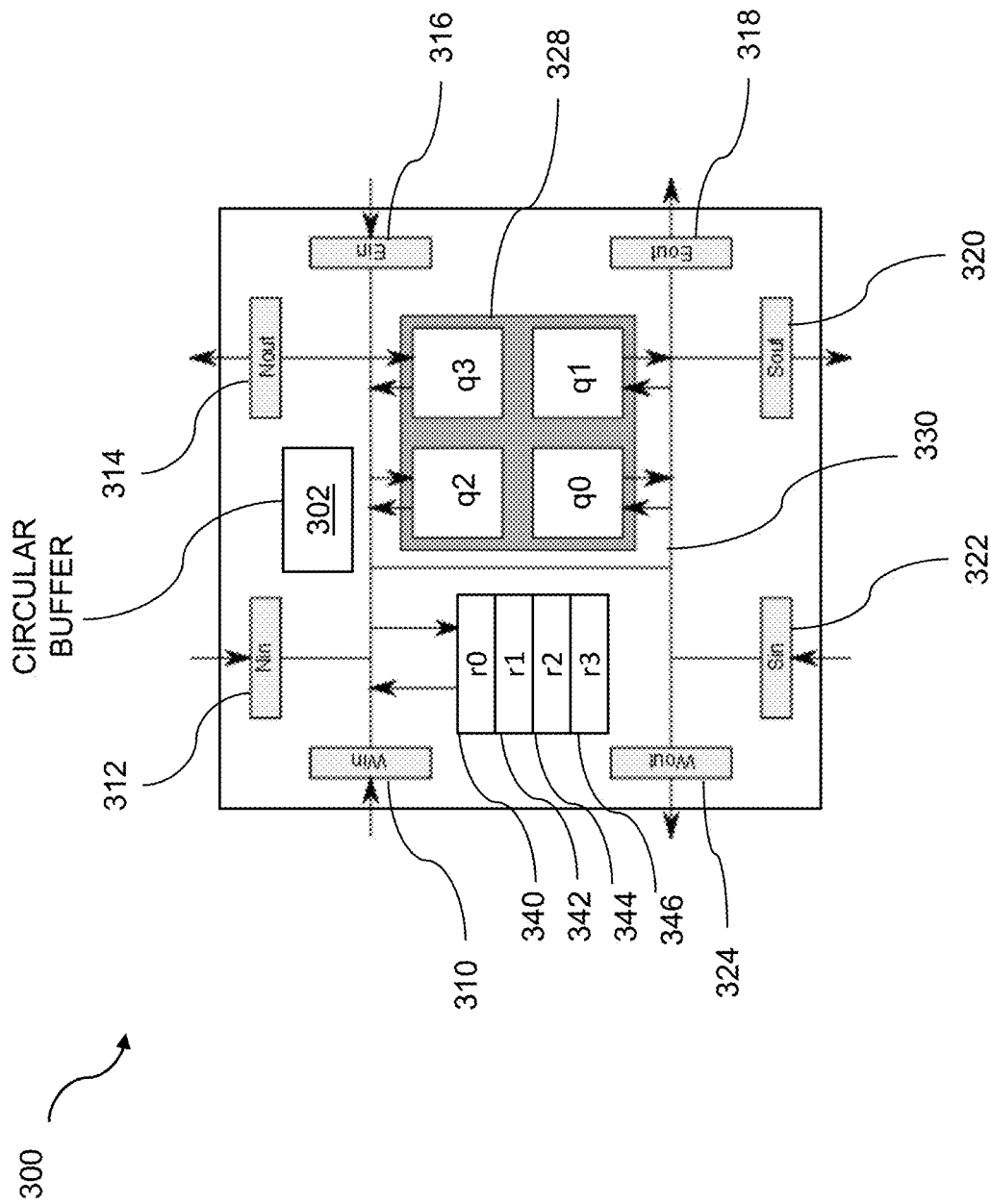
FIG. 3 is an example cluster for course-grained reconfigurable processing.

FIG. 3 is an example cluster for course-grained reconfigurable processing. The cluster 300 comprises a circular buffer 302. The circular buffer 302 can be referred to as a main circular buffer or a switch-instruction circular buffer. In some embodiments, the cluster 300 comprises additional circular buffers corresponding to processing elements within the cluster. The additional circular buffers can be referred to as processor instruction circular buffers. The example cluster 300 comprises a plurality of logical elements, configurable connections between the logical elements, and a circular buffer 302 controlling the configurable connections. The logical elements can further comprise one or more of switching elements, processing elements, or storage elements. The example cluster 300 also comprises four processing elements (q0, q1, q2, and q3). The four processing elements can collectively be referred to as a "quad," and jointly indicated by a grey reference box 328. In embodiments, each of the four processing elements intercommunicate between and among each other. In embodiments, the circular buffer 302 controls the passing of data to the quad of processing elements 328 through switching elements. In embodiments, the four processing elements 328 comprise a processing cluster. In some cases, the processing elements can be placed into a sleep state. In embodiments, the processing elements wake up from a sleep state when valid data is applied to the inputs of the processing elements. In embodiments, the individual processors of a processing cluster share data and/or instruction caches. The individual processors of a processing cluster can implement message passing via a bus or shared memory interface. Power gating can be applied to one or more processors (e.g. q1) in order to reduce power.

The cluster 300 can further comprise storage elements coupled to the configurable connections. As shown, the cluster 300 comprises four storage elements (r0 340, r1 342, r2 344, and r3 346). The cluster 300 further comprises a north input (Nin) 312, a north output (Knout) 314, an east input (Ein) 316, an east output (Eout) 318, a south input (Sin) 322, a south output (Sout) 320, a west input (Win) 310, and a west output (Wout) 324. The circular buffer 302 can contain switch instructions that implement configurable connections. For example, an instruction can effectively connect the west input 310 with the north output 314 and the east output 318 and this routing is accomplished via bus 330. The cluster 300 can further comprise a plurality of circular buffers residing on a semiconductor chip where the plurality of circular buffers control unique, configurable connections between the logical elements.

As stated previously, the preprocessor can be configured to prevent data collisions within the circular buffer 302. The prevention of collisions can be accomplished by inserting no-op or sleep instructions into the circular buffer (pipeline). Alternatively, in order to prevent a collision on an output port, intermediate data can be stored in registers for one or more pipeline cycles before being sent out on the output port. In other situations the preprocessor can change one switching instruction to another switching instruction to avoid a conflict. For example, in some instances the preprocessor can change an instruction that is placing data on the west output 324 to an instruction that places data on the south output 320, such that the data can be output on both output ports within the same pipeline cycle. In a case where data needs to travel to a cluster that is both south and west of the cluster 300, it can be more efficient to send the data directly to the south output port rather than storing the data in a register and sending the data to the west output on a subsequent pipeline cycle.

Figure 4:
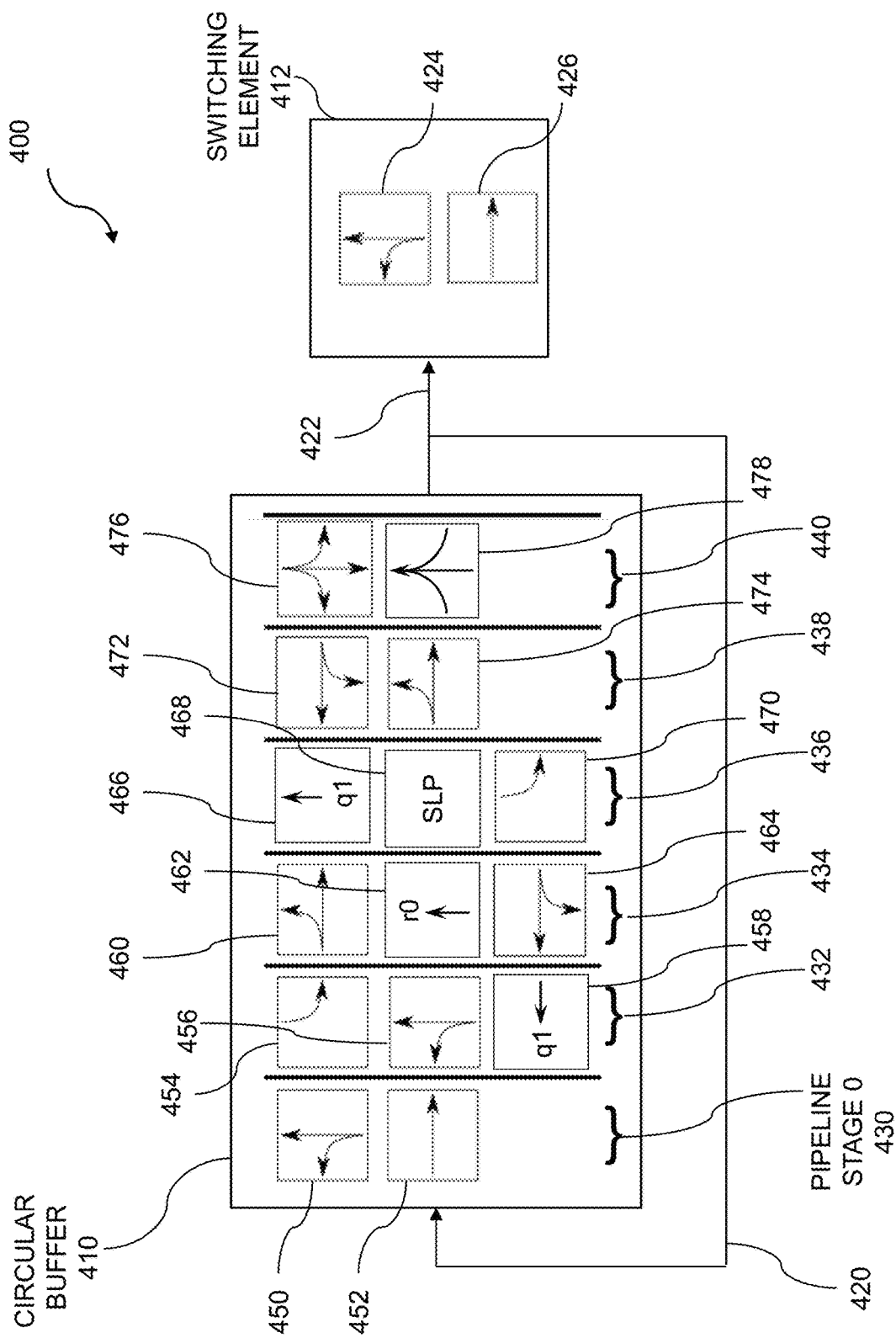
FIG. 4 shows an example circular buffer associated with switching elements.

FIG. 4 shows an example circular buffer associated with switching elements. The block diagram 400 describes an apparatus for data manipulation showing a circular buffer 410 and a corresponding switching element 412. The circular buffer 410 contains a plurality of pipeline stages. Each pipeline stage contains one or more instructions, up to a maximum instruction depth. In the embodiment shown in FIG. 4, the circular buffer 410 is a 6×3 circular buffer, meaning that the buffer implements a six stage pipeline with an instruction depth of up to three instructions per stage (column). Hence, the circular buffer 410 can include one, two, or three switch instruction entries per column. In some embodiments, the plurality of switch instructions per cycle comprises two or three switch instructions per cycle. However, in certain embodiments, the circular buffer 410 supports only a single switch instruction in a given cycle. In the block diagram example 400 shown, the step Pipeline Stage 0 430 has an instruction depth of two instructions 450 and 452. Though the remaining pipeline stages 1-5 are not textually labeled in the FIG. 400, but the stages are indicated by callout numbers, 432, 434, 436, 438, and 440, respectively. Pipeline Stage 1 432 has an instruction depth of three instructions, 454, 456, and 458. Pipeline Stage 2 434 has an instruction depth of three instructions, 460, 462, and 464. Pipeline Stage 3 436 also has an instruction depth of three instructions, 466, 468, and 470. Pipeline Stage 4 438 has an instruction depth of two instructions, 472 and 474. And, Pipeline Stage 5 440 also has an instruction depth of two instructions, 476 and 478. In embodiments, the circular buffer 410 includes 64 columns.

During operation, the circular buffer 410 rotates through configuration instructions. The circular buffer 410 can dynamically change operation of the logical elements based on where it is in the rotation. The circular buffer 410 can comprise a plurality of switch instructions per cycle for the configurable connections.

The instruction 452 is an example of a switch instruction. In embodiments, each cluster has four inputs and four outputs, each designated within the cluster's nomenclature as "north," "east," "south," and "west," respectively. For example, the instruction 452 in the diagram 400 is a west-to-east transfer instruction. The instruction 452 directs the cluster to take data on its west input and send out the data on its east output. Another example of data routing, the instruction 450, is a fan-out instruction. The instruction 450 instructs the cluster to take data on its south input and send out the data on both its north output and its west output. The arrows within each instruction box indicate the source and destination of the data. Continuing with more examples, the instruction 478 is an example of a fan-in instruction. The instruction 478 directs the cluster to take data from its west, south, and east inputs and to send out the data on its north output. Therefore, the configurable connections can be considered to be time multiplexed. Instructions such as those shown in FIG. 4 can be used in the circular buffers that are internal to L2 switches. For a circular buffer in an interface stage, the instructions can include example FIFO encoding and switch settings. In embodiments, the circular buffer 410 that rotates does not include any branching in the instructions. Thus, the circular buffer 410 that rotates can include instructions from a branchless set of operations.

In embodiments, the clusters implement multiple storage elements in the form of registers. In the example 400 shown, the instruction 462 is a local storage instruction. The instruction 462 directs the cluster to take data from its south input and store it in a register (r0). Some embodiments utilize four general purpose registers, here referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible. The instruction 468 is a sleep instruction. The instruction 468 instructs the cluster to enter a low power "sleep" state.

In embodiments, the clusters implement multiple processing elements in the form of processor cores, here referred to as cores q0, q1, q2, and q3. In this example, four cores are used, though any number of cores is possible. The instruction 458 is a processing instruction. The instruction 458 directs the cluster to take data from the cluster's east input and send the data to a processor q1 for processing. The processor or processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 400 shown, the circular buffer 410 rotates instructions in each pipeline stage into a switching element 412 via a forward data path 422, and also back to the first stage, Pipeline Stage 0 430, via a feedback data path 420. Instructions can include switching instructions, storage instructions, and processing instructions, among others. The feedback data path 420 can allow instructions within the switching element 412 to be transferred back to the circular buffer 410. Hence, instructions 424 and 426 in the switching element 412 can also be transferred back to the Pipeline Stage 0 as instructions 450 and 452. In addition to the instructions depicted in FIG. 4, a no-op instruction can also be inserted into a pipeline stage. In embodiments, a no-op instruction prevents execution from being performed during a given cycle. In effect, the introduction of a no-op instruction can cause a column within the circular buffer 410 to be skipped in a cycle. In contrast, not skipping an operation indicates that a valid instruction is being pointed to in the circular buffer. Also, a sleep state can be accomplished by not applying a clock to a circuit, not performing processing within a processor, removing a power supply voltage or bringing a power supply to ground, storing information into a non-volatile memory for future use and then removing the power applied to the memory, or by similar techniques. A sleep instruction is an instruction that causes no execution to be performed until an explicitly specified, predetermined event occurs which causes the logical element to exit the sleep state. The predetermined event can be the arrival or availability of valid data. The data can be determined to be valid using null convention logic (NCL). In embodiments, only valid data is allowed to flow through the switching elements, and Xs (invalid data points) are not propagated by instructions.

In some embodiments, the sleep state is exited based on an instruction applied to a switching fabric. In other embodiments, the sleep state can only be exited by a stimulus external to the logical element, and not based on the programming of the logical element. The external stimulus can include an input signal, which in turn can cause a wake-up or an interrupt service request to execute on one or more of the logical elements. An example of such a wake-up request can be seen in the instruction 458, assuming that the processor q1 was previously in a sleep state. In embodiments, when the instruction 458 takes valid data from the east input of the cluster and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 466. In the case of the instruction 466, data from the processor q1 is moved to the north output of the processor. In some embodiments, if Xs have been placed into the processor q1, such as during the execution of the instruction 458, then Xs would be retrieved from the processor q1 during the execution of the instruction 466 and in turn applied to the north output of the cluster containing the instruction 466.

A collision occurs if multiple instructions route data simultaneously to a particular port in a given pipeline stage. For example, if the instructions 452 and 454 are in the same pipeline stage, they will both send data to the east output at the same time, thus causing a collision since neither instruction is part of a time-multiplexed fan-in instruction (such as the instruction 478). To avoid potential collisions, certain embodiments use preprocessing by a compiler or other means to arrange the instructions in such a way that there are no collisions when the instructions are loaded into the circular buffer. Thus, the circular buffer 410 can be statically scheduled in order to prevent data collisions. In embodiments, when the preprocessor detects a data collision, the scheduler changes the order of the instructions to prevent the collision. Alternatively or additionally, the preprocessor can insert further instructions such as storage instructions (e.g. the instruction 462), sleep instructions, or no-op instructions, to prevent the collision. Alternatively or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Figure 5:
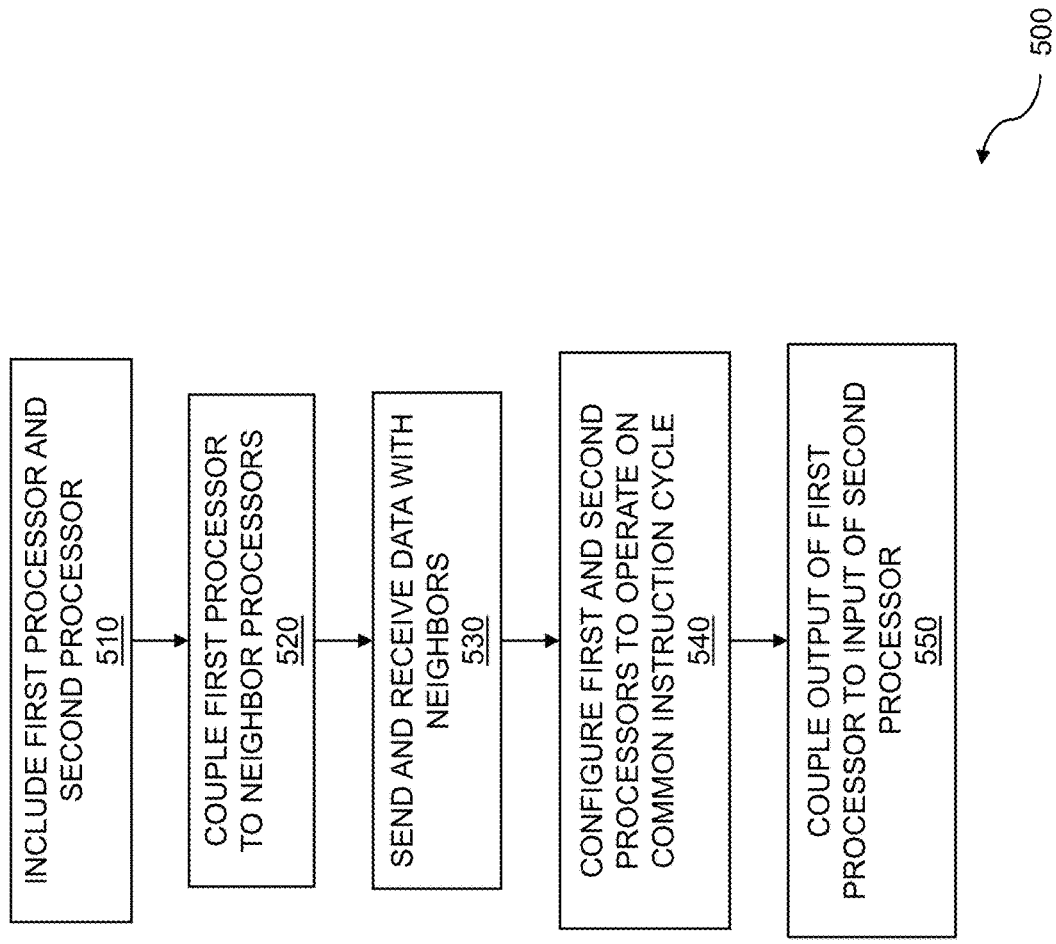
FIG. 5 is a flow diagram for processing.

FIG. 5 is a flow diagram for processing. The flow 500 begins with including a first processor and a second processor 510. The processors can be software reconfigurable processors. The processors can be from a plurality of interconnected reconfigurable processors. The processors can be controlled by rotating circular buffers. Flow 500 includes coupling the first processor to neighbor processors 520. The flow 500 includes sending and receiving data with neighbor processors 530. Neighbor processors can be the interconnected processors of a cluster, as previously described in FIG. 2. Flow 500 also includes configuring the first and second processors to operate on a common instruction cycle 540. The flow 500 includes coupling the output of the first processor to the input of the second processor 550. Multiple different couplings can be configured and reconfigured. Various steps in the flow 500 may be changed in order, repeated, omitted, or the like without departing from the disclosed concepts. Various embodiments of the flow 500 can be included in a computer program product embodied in a non-transitory computer readable medium that includes code executable by one or more processors.

Figure 6:
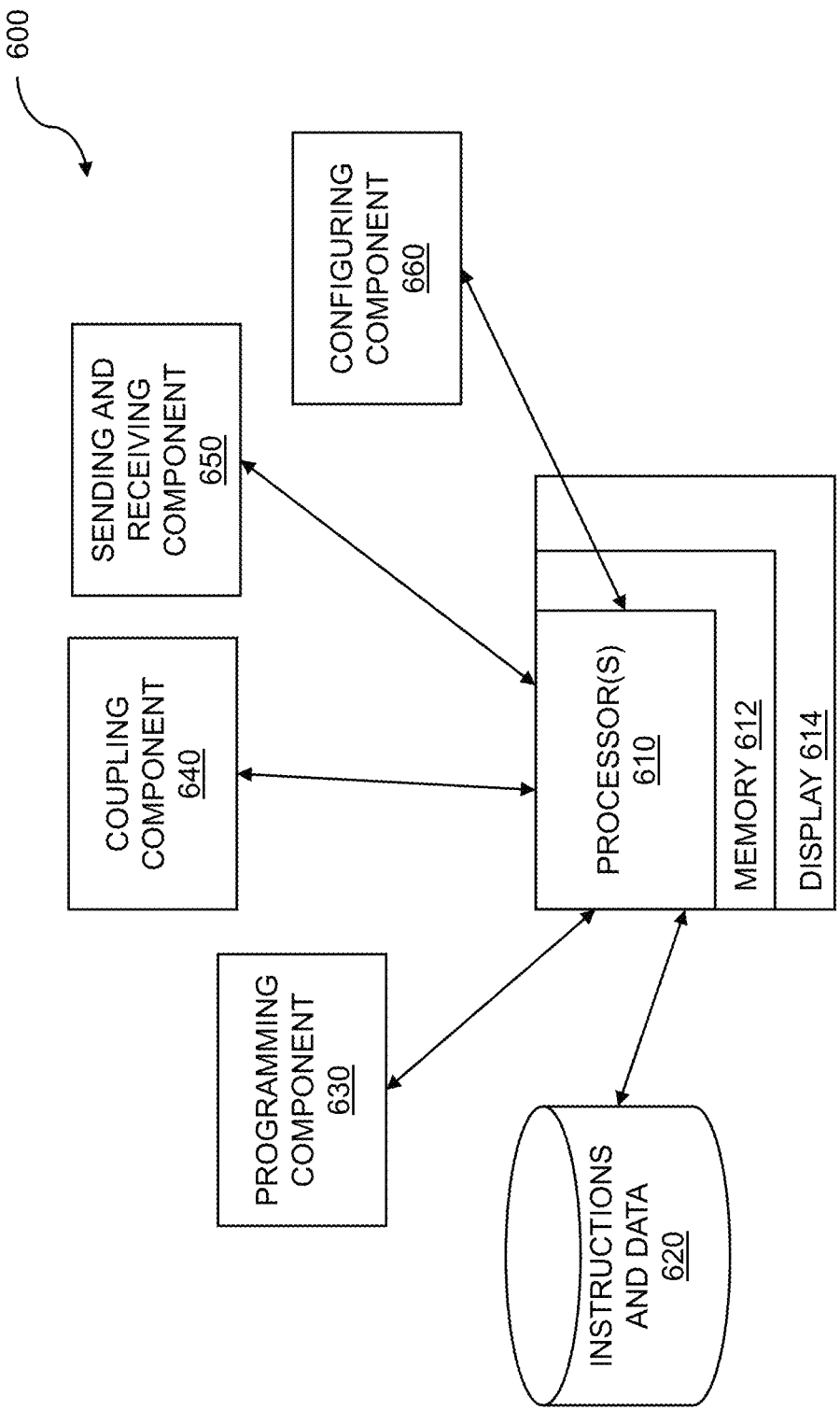
FIG. 6 is a system for processing.

FIG. 6 is a system for processing. The system 600 can implement a computation apparatus. The system 600 can include one or more processors 610 coupled to a memory 612 which store instructions. The system 600 can include a display 614 coupled to the one or more processors 610 for displaying data, dataflow graphs, intermediate steps, instructions, and so on. The one or more processors 610, when executing the instructions which are stored, are configured to design a processing architecture comprising: a plurality of software programmable processors controlled by rotating circular buffers wherein: a first processor and a second processor within the plurality of software programmable processors are individually programmable; the first processor within the plurality of software programmable processors is coupled to neighbor processors within the plurality of software programmable processors; the first processor sends and receives data from the neighbor processors; the first processor and the second processor are configured to operate on a common instruction cycle; and an output of the first processor from a first instruction cycle is an input to the second processor on a subsequent instruction cycle. Instructions and data 620 can be stored in memory 612 through processor 610. Other embodiments where direct memory access of memory 612 to store instructions and data 620 without going through processor 610 is possible. Programming component 630 can program the software programmable processors. Coupling component 640 can couple the first processor to neighbor processors. The first processor and the neighbor processors can be part of a cluster. The cluster can comprise a dataflow processor. The cluster can comprise a reconfigurable fabric. Sending and receiving component 650 can enable the first processor to send and receive data from the neighboring processors. The configuring component 660 can configure the first processor and the second processor to operate on a common instruction cycle. Coupling component 640 can couple the output of the first processor from a first instruction cycle to be an input to the second processor on a subsequent instruction cycle.

In embodiments, a processor-implemented method is disclosed for assembling an apparatus for processing. The method comprises: including a plurality of software programmable processors controlled by circular buffers wherein a first processor and a second processor within the plurality of software programmable processors are individually programmable; coupling the first processor within the plurality of software programmable processors to neighbor processors within the plurality of software programmable processors; sending and receiving, by the first processor, data from the neighbor processors; configuring the first processor and the second processor to operate on a common instruction cycle; and coupling an output of the first processor from a first instruction cycle to an input to the second processor on a subsequent instruction cycle. In embodiments, a computer program product is embodied in a non-transitory computer readable medium for implementation of a computation apparatus. The computer program product comprises code which causes one or more processors to perform operations of designing a data manipulation architecture including: a plurality of software programmable processors controlled by rotating circular buffers wherein: a first processor and a second processor within the plurality of software programmable processors are individually programmable; the first processor within the plurality of software programmable processors is coupled to neighbor processors within the plurality of software programmable processors; the first processor sends and receives data from the neighbor processors; the first processor and the second processor are configured to operate on a common instruction cycle; and an output of the first processors from a first instruction cycle is an input to the second processor on a subsequent instruction cycle.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a technique for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. An apparatus for processing comprising:
a plurality of software programmable processors controlled by rotating circular buffers wherein:
a first processor and a second processor within the plurality of software programmable processors are individually programmable;
the first processor within the plurality of software programmable processors is coupled to neighbor processors within the plurality of software programmable processors;
the first processor sends and receives data from the neighbor processors;
the first processor and the second processor are configured to operate on a common instruction cycle;
an output of the first processor from a first instruction cycle is an input to the second processor on a subsequent instruction cycle, wherein the subsequent instruction cycle is an immediately subsequent instruction cycle;
the first processor further comprises an arithmetic logic unit controlled by a circular buffer; and
the circular buffer provides for dynamic programming of the arithmetic logic unit.

2. The apparatus of claim 1 wherein the second processor is one of the neighbor processors.

3. The apparatus of claim 1 wherein an input for the arithmetic logic unit comes from one of the neighbor processors.

4. The apparatus of claim 1 wherein an input for the arithmetic logic unit comes from a location beyond the neighbor processors.

5. The apparatus of claim 1 wherein the first processor further comprises an accumulator wherein the arithmetic logic unit provides input to the accumulator.

6. The apparatus of claim 5 wherein output from the accumulator is provided to one or more of the neighbor processors.

7. The apparatus of claim 5 wherein output from the accumulator is provided to a location beyond the neighbor processors.

8. The apparatus of claim 5 wherein output from the accumulator is provided as input to the arithmetic logic unit.

9. The apparatus of claim 1 wherein the circular buffer is statically scheduled.

10. The apparatus of claim 1 wherein circular buffers of the neighbor processors are programmed to a harmonic length of the circular buffer of the first processor.

11. The apparatus of claim 1 wherein the first processor is configured to avoid data collisions by programming of the circular buffer.

12. The apparatus of claim 1 wherein the plurality of software programmable processors comprises a reconfigurable fabric.

13. The apparatus of claim 1 wherein the common instruction cycle is defined by a hum cycle boundary.

14. The apparatus of claim 1 wherein the plurality of software programmable processors comprises a dataflow processor.

15. The apparatus of claim 1 wherein the first processor is placed into a sleep state.

16. The apparatus of claim 15 wherein the first processor is placed into a sleep state based on a sleep instruction in a circular buffer.

17. The apparatus of claim 16 wherein the first processor wakes from a sleep state based on valid data being present.

18. The apparatus of claim 1 wherein the circular buffer contains instructions.

19. The apparatus of claim 1 wherein the circular buffer contains status bits.

20. The apparatus of claim 1 wherein the circular buffer contains control bits.

21. A processor-implemented method for assembling an apparatus for processing comprising:
including a plurality of software programmable processors controlled by rotating circular buffers, wherein:
a first processor and a second processor within the plurality of software programmable processors are individually programmable;
the first processor further comprises an arithmetic logic unit controlled by a circular buffer; and
the circular buffer provides for dynamic programming of the arithmetic logic unit;
coupling the first processor within the plurality of software programmable processors to neighbor processors within the plurality of software programmable processors;
sending and receiving, by the first processor, data from the neighbor processors;
configuring the first processor and the second processor to operate on a common instruction cycle; and
coupling an output of the first processor from a first instruction cycle to an input to the second processor on a subsequent instruction cycle, wherein the subsequent instruction cycle is an immediately subsequent instruction cycle.

22. A computer program product embodied in a non-transitory computer readable medium for implementation of a computation apparatus comprising code for designing a data manipulation architecture including:
a plurality of software programmable processors controlled by rotating circular buffers wherein:
a first processor and a second processor within the plurality of software programmable processors are individually programmable;
the first processor further comprises an arithmetic logic unit controlled by a circular buffer;
the circular buffer provides for dynamic programming of the arithmetic logic unit;
the first processor within the plurality of software programmable processors is coupled to neighbor processors within the plurality of software programmable processors;
the first processor sends and receives data from the neighbor processors;
the first processor and the second processor are configured to operate on a common instruction cycle; and
an output of the first processor from a first instruction cycle is an input to the second processor on a subsequent instruction cycle, wherein the subsequent instruction cycle is an immediately subsequent instruction cycle.

\* \* \* \* \*